Nov. 26, 1935.  L. E. LA BRIE  2,022,046
BRAKE
Filed July 25, 1930  2 Sheets-Sheet 1
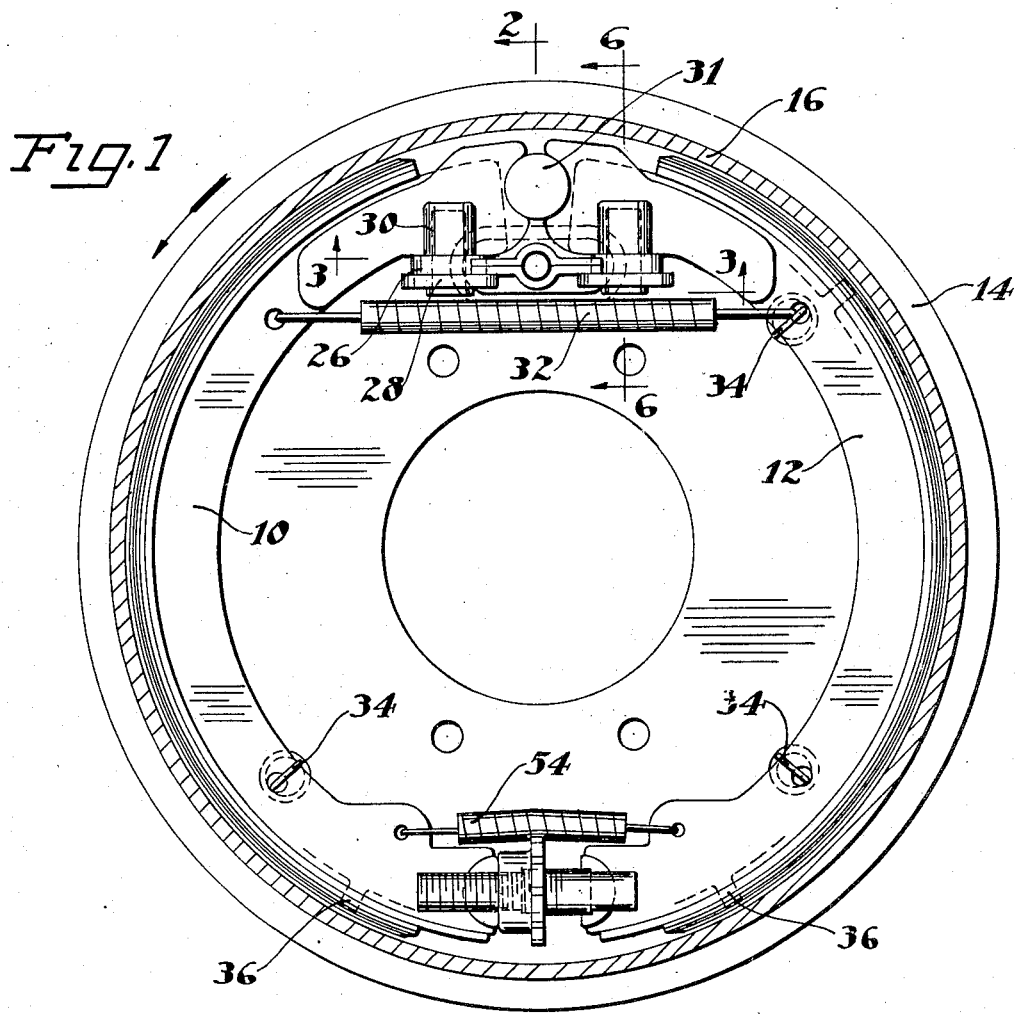
Fig.1
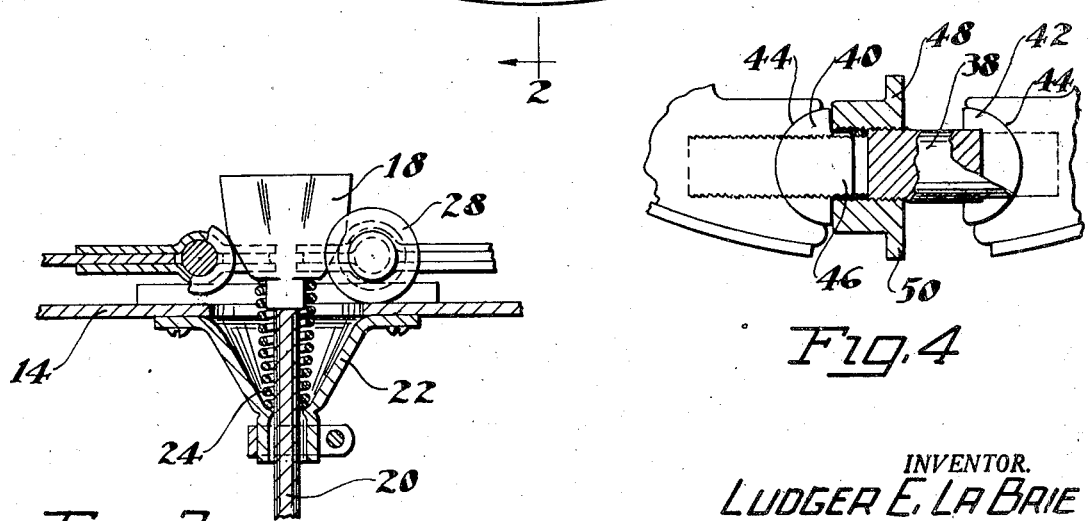
Fig.3
Fig.4
INVENTOR.
LUDGER E. LA BRIE
BY
ATTORNEY Nov. 26, 1935.　　　L. E. LA BRIE　　　2,022,046
BRAKE
Filed July 25, 1930　　　2 Sheets-Sheet 2
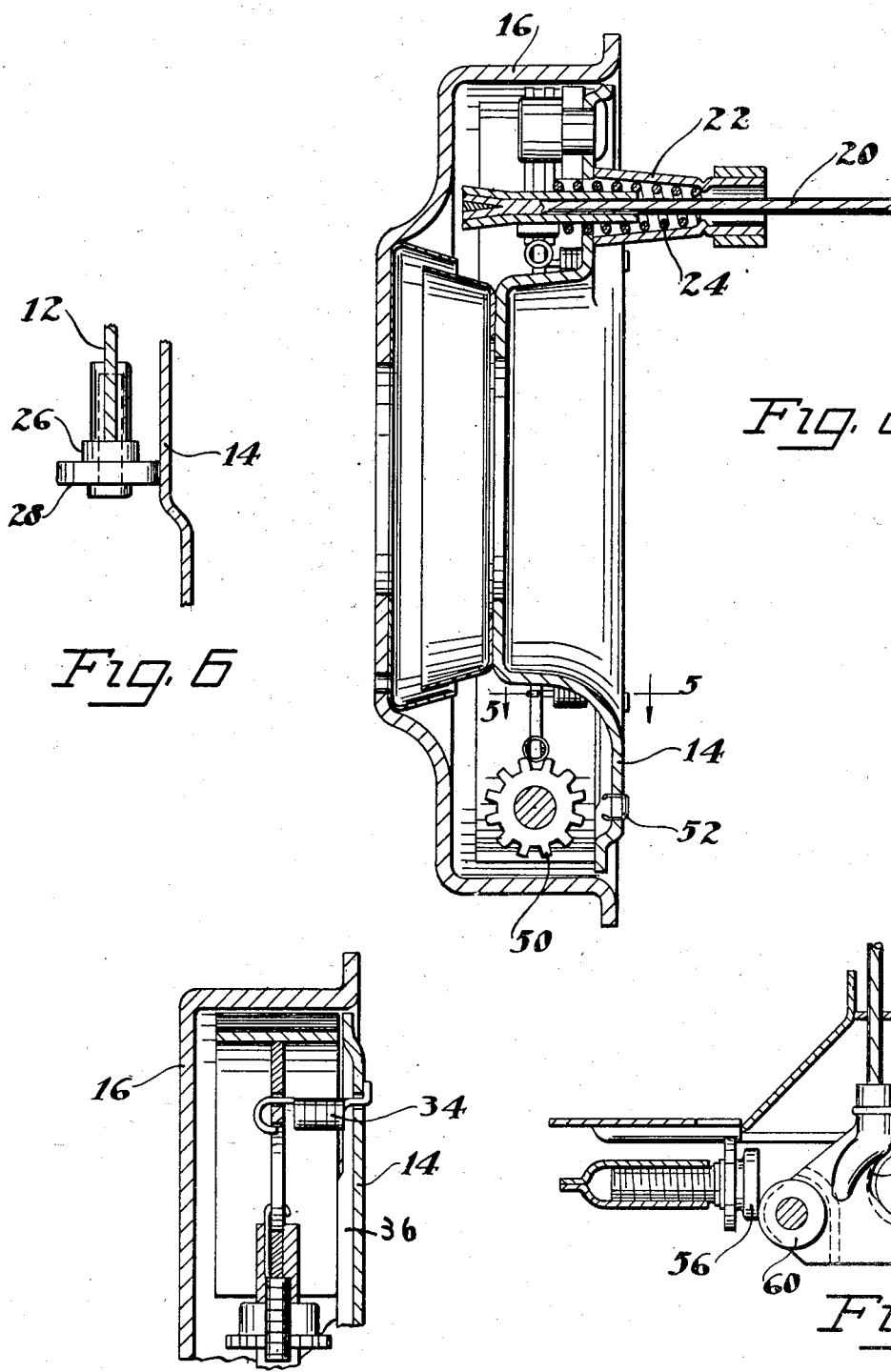
INVENTOR.
LUDGER E. LA BRIE
BY
　　M. W. McConkey
　　　ATTORNEY Patented Nov. 26, 1935

2,022,046

UNITED STATES PATENT OFFICE 2,022,046

BRAKE

Ludger E. La Brie, South Bend, Ind., assignor to Bendix Brake Company, South Bend, Ind., a corporation of Illinois Application July 25, 1930, Serial No. 470,577

7 Claims. (Cl. 188—78)

This invention relates to brakes and is illustrated as embodied in a double wrapping two shoe brake of the internal expanding type and which is particularly adapted for the front wheels of an automobile in a four wheel braking system.

In brakes of this type the problem of control is a serious one, inasmuch as the servo and wrapping effects of its friction elements, bring into play powerful forces.

An object of the invention lies in simplifying the control or applying mechanism to provide a minimum of cheaply fabricated and easily assembled, but withall effective parts. To this end there is suggested a laterally movable floating wedge member contactable with vertically extending thrust members, preferably rollers, which members are located on adjacent spaced apart ends of the friction elements of the brake. The wedge member is also preferably positioned immediately beneath an anchor member for the brake which latter member receives the thrust of the brake in either direction of drum rotation.

A further and important object of the invention is to obviate objectionable noise in a brake of this type often incurred by the violent contact of a friction element with the anchor member when the brake is applied. It is therefore preferred that the anchorage of the brake be predetermined for forward braking by frictionally increasing the resistance to motion of the secondary shoe, or other anchoring portion of the friction means, appreciably over that of the primary shoe or other applying sector of the brake, for example if a band be employed in lieu of shoes. Laterally actuating springs or equivalent means are preferably provided to draw the shoes into constant engagement with raised portions on the brake supporting plate, thereby effecting this frictional resistance, the spring elements being positioned to insure the above mentioned anchoring function.

A further object of the invention lies in the provision of a simple but effective adjusting means for the friction element or elements of the brake, to increase the over-all length thereof to compensate for lining wear.

Other objects and meritorious features of the invention including particular elements, sub-combinations and combinations of parts will become apparent from the following detailed description of a preferred embodiment thereof shown in the accompanying drawings, in which:

Figure 1 is a side elevation of the parts of the brake,

Figure 2 is a sectional view taken on the line 2—2 of Figure 1 through the brake showing parts of the applying and adjusting mechanism in detail, Figure 3 is a section taken on line 3—3 of Figure 1, disclosing the wedge operating means for the brake in detail, Figure 4 discloses in detail and partly in section the adjusting means for the elements of the brake, Figure 5 is a partial section taken on line 5—5 of Figure 2, disclosing the retracting springs of the brake in detail, Figure 6 is an enlarged section of the roller thrust element of the brake taken on line 6—6 of Figure 1, and Figure 7 is a view disclosing a modified form of applying mechanism together with a novel combined adjusting and thrust element cooperating with said applying mechanism.

Referring now to the embodiment of my invention disclosed in Figure 1, there are shown similar interchangeable T section brake shoe elements 10 and 12 mounted upon the usual brake support plate 14 and within the conventional rotatable brake drum 16. The brake shoes are preferably articulated by my novel adjustable connecting means described in detail hereafter, and which friction elements may be spread apart into drum engagement by expanding mechanism located at the top of the brake. This applying or expanding mechanism preferably comprises a two-part wedge member 18 which parts are recessed intermediate their inclined sides to receive the enlarged end of a flexible brake operating cable 20 suitably connected to transmission elements to be operated by the service pedal. The cable is preferably housed within a two part bracket member 22 rigidly secured to the backing plate 14, a spring 24 being interposed between the end of the bracket and the wedge member 18 to insure a return of said member upon release of the brake. The wedge applying member 18 preferably contacts the upper and smaller of two juxtaposed rollers 26 and 28 rotatably mounted on a shaft 30, the latter bifurcated at its upper end to straddle and be secured to the reinforced recessed ends of the friction element or elements of the brake. The larger of the rollers 28 is preferably positioned in engagement with the brake support plate 14 (Figure 6) to position the brake laterally and guide the same during its applying movement.

An anchor member 31, preferably cylindrical, is positioned within the recessed portions in the reinforcements at the end of the brake elements and also above the wedge operating element which latter element bridges the ends of the friction members. Return spring 32 is preferably secured to the ends of the friction elements to draw the same into engagement with the anchor and also facilitate return of the wedge applying means to inoperative position.

According to an important feature of my invention, one end of the brake is maintained in contact with the anchor during forward braking. I have disclosed in Figure 1 a left front brake, the normal direction of drum rotation being counter clockwise as indicated by the arrow. The friction element 12 therefore becomes the anchoring element during this forward braking and to insure its remaining anchored and thereby obviate objectionable anchoring noise, which would otherwise ensue, I have provided means for maintaining the shoe in constant engagement with the anchor 31 during forward braking. As clearly disclosed in Figure 5, there are provided transversally extending tensional spring elements 34 secured at their ends to the web of the shoes and to the brake support plate. It will be noted from the Figure 1 that I have disclosed three of such springs, one adjacent the end of the shoe 12 and the other two positioned on opposite sides of the adjusting means to be described hereafter. These return springs 34 draw the rims of the friction elements laterally into constant engagement with the embossed or raised portions 36 on the backing plate and also draw the rollers 28 into engagement with the plate. There is accordingly a drag or frictional resistance to motion of the friction elements set up and by eliminating the spring on the shoe 10 opposite the upper spring 34 on the shoe 12 there is insured the movement of the primary friction element 10 while the secondary or anchoring shoe element 12 remains in contact with the anchor. It is to be particularly noted however, that the resistance to motion of the shoe element 12 is a frictional one with the brake support plate, which degree of friction is a function of the contracting effect of the return springs 34.

I have also disclosed a novel form of adjusting mechanism for the elements of the brake, said mechanism being disclosed in detail in Figure 4. This adjusting mechanism preferably comprises an externally threaded connecting thrust element 38 bifurcated at its ends to straddle the web ends of the friction elements. This adjusting member also receives between its end furcations segments 40 and 42 seated within curved recesses 44 in the ends of the shoe webs.

The segment 40 as disclosed in Figure 4, is further preferably provided with a projection 46 and the segment 42 is preferably recessed on its flat side to provide shoulders overlying the exterior surface of the adjusting member;

A nut 48 is threadedly mounted on the adjusting element which nut preferably abuts at its end the segment 40. The nut is also preferably provided with teeth 50 positioned opposite an opening 52 in the brake support plate 14, which opening is adapted to receive a tool to be seated within the teeth to turn the nut effecting the adjusting operation.

Rotation of the nut by the tool (not shown) serves to relatively move the segment 40 and the member 38 thereby moving the friction elements apart to increase the over-all length of the brake and compensate for lining wear. The segments 40 and 42 fitting within the circular recesses with the friction elements permit the necessary rocking movement of the parts during the application of the brake. A return spring 54 secured to each of the friction elements serves to maintain the parts of the adjusting mechanism in close contact.

Describing now the operation of the brake, lateral movement of the wedge 18 serves to transmit an operating force to the ends of the shoes and inasmuch as, in forward braking, resistance to motion of the shoe 12 is greater than that of shoe 10, the shoe 10 will move outward into engagement with the drum and will be thereafter wiped around by the same, forcing the shoe 12 into braking engagement with the drum. During this applying phase, as previously described, shoe 12 remains anchored by virtue of the action of the upper return spring 34. The lower return springs 34 also maintain the shoes in a predetermined path during their applying movement and also obviate rattle of the brake parts. Upon the release of the brake, the return springs 34, which have been stretched, serve to return the parts to their inoperative position. This return function of the springs is also aided by the rotating drum which will contact high spots on the shoes or other friction members to push the brake back to its inoperative position. With respect to the last described function of the revolving drum, that is to position the brake when not in operation, it is to be noted that the conventional stops have been deliberately omitted from the brake structure.

With the drum rotating clockwise in reverse braking, shoe 10 is forced into engagement with the drum, shoe 12 remaining anchored, whereupon shoe 12 is then forced into engagement with the drum to effect the braking operation. This action in reverse braking will, with the structure disclosed, cause the undesirable click or anchoring noise which is obviated in forward braking, but the comparative infrequent applications of the brake in reverse braking minimizes this objectionable feature.

I have disclosed in Figure 7 a modified form of applying mechanism wherein a tubular portion of the primary shoe, fashioned by oppositely embossing web portions of the shoe, receives a headed adjusting thrust element 56. An irregular shaped wedge applying member 58 supports a roller 60, which is in engagement with the thrust element 56. The wedge member is also recessed at 62 to contact the previously described roller structure on the secondary shoe. Over-all length of the frictional face of the brake is thus compensated for by adjusting the thrust element. With respect to the operation of the wedge actuating member, the same functions in an identical manner with that previously described, the secondary shoe remaining anchored during the applying of the shoe prior to forward braking.

While I have illustrated and described somewhat in detail one embodiment of my invention, it is not my intention to limit the scope of the invention to this particular embodiment or otherwise than by the terms of the appended claims. The adjusting mechanism described above is claimed in my divisional application No. 758,424, filed December 20, 1934.

Having thus described the features of the invention, what I claim as new and desire to secure by Letters Patent is:

1. Brake mechanism comprising, in combination with a rotatable drum, friction elements positioned within the drum provided with thrust elements secured by means of pivots fixedly carried by said elements to adjacent spaced apart ends of said elements and movable about parallel axes arranged approximately radially of the brake, anchor means for the friction elements positioned between the ends thereof between said thrust elements and the drum, together with a laterally movable wedge member extending between and in engagement with said thrust elements, and a backing plate carrying the friction elements and arranged at the open side of the drum and having rolling engagement with said thrust elements.

2. Brake mechanism comprising, in combination with a rotatable drum, friction elements positioned within the drum provided with roller thrust elements secured by means of pivots fixedly carried by said elements to adjacent spaced apart and recessed ends of said elements and which are rotatable about parallel axes extending approximately radially of the brake, a cylindrical anchor means for the friction elements positioned between the ends thereof between said thrust elements and the drum, together with a laterally movable wedge member extending between and bridging the ends of said friction elements and in engagement with the thrust elements thereon, and a backing plate carrying the friction elements and arranged at the open side of the drum and having rolling engagement with said thrust elements.

3. Brake mechanism comprising, in combination with a rotatable drum, friction elements positioned within the drum provided with radially extending roller thrust elements, the latter mounted on shaft members secured to adjacent spaced apart and recessed ends of said friction elements, anchor means for the friction elements positioned between and engaging the recessed ends thereof above said thrust elements, together with transversely extending and laterally movable wedge means having a rolling friction engagement with said thrust elements, said roller elements having supporting flanges engaging and supporting the face of the wedge means nearest the center of the drum, and a backing plate carrying the friction elements and arranged at the open side of the drum and having rolling engagement with said thrust elements.

4. A brake comprising, a rotatable drum, a plurality of friction elements having spaced apart ends to receive an applying member, a support plate for said friction elements, an anchoring element adjacent said ends to receive the braking thrust in either direction of drum rotation, together with means operable to draw said elements into frictional contact with said support plate, said means being so positioned as to predetermine the anchorage of the friction elements at least in one direction of drum rotation.

5. A brake comprising a rotatable drum, friction means having spaced apart ends, a support for said friction means, an anchor element adjacent said ends to receive the braking torque in either direction of drum rotation, together with spring means operable to draw said friction means into frictional contact with said support plate, said spring means being so positioned as to predetermine the anchorage of the friction means at least in one direction of drum rotation.

6. A brake comprising, a rotatable drum, a plurality of friction elements within said drum having spaced apart ends to receive an applying member, a support plate for said friction elements, anchor means adjacent said ends to receive the braking thrust in either direction of drum rotation, together with spring means connected to said support and friction elements, said latter means operable to draw said elements laterally into frictional contact with said support plate, and which spring means are so positioned as to predetermine the anchorage of the brake at least in one direction of drum rotation.

7. Brake mechanism comprising friction means having spaced apart ends, said ends provided with roller thrust members mounted on vertically extending shaft members, the latter members bifurcated at their upper ends to straddle the ends of the friction means.

LUDGER E. LA BRIE.